United States Patent [19]
Edwards

[11] 3,784,052
[45] Jan. 8, 1974

[54] STACKABLE CONTAINER

[75] Inventor: Bryant Edwards, Clarendon Hills, Ill.

[73] Assignee: Illinois Tool Works Inc., Chicago, Ill.

[22] Filed: Dec. 30, 1971

[21] Appl. No.: 214,276

[52] U.S. Cl. ............ 220/97 C, 206/65 K, 229/1.5 B
[51] Int. Cl. ......................... B65d 21/02, B65d 1/26
[58] Field of Search ..................... 220/97 C, 97 F; 229/1.5 B; 206/56 K, 65 K

[56] References Cited
UNITED STATES PATENTS

| 3,442,420 | 5/1969 | Edwards | 220/97 C |
| 3,139,213 | 6/1964 | Edwards | 220/97 C |
| 2,564,834 | 8/1951 | Devine | 220/97 F |
| 3,347,411 | 10/1967 | Kalata | 220/97 C |

FOREIGN PATENTS OR APPLICATIONS

| 910,841 | 11/1962 | Great Britain | 229/1.5 B |

*Primary Examiner*—George E. Lowrance
*Attorney*—R. W. Beart et al.

[57] ABSTRACT

A relatively thin walled plastic container including bottom stacking means such that a plurality of the subject containers in a stacked or nested condition will provide a column of containers which are not subject to jamming in storage or transport.

2 Claims, 4 Drawing Figures

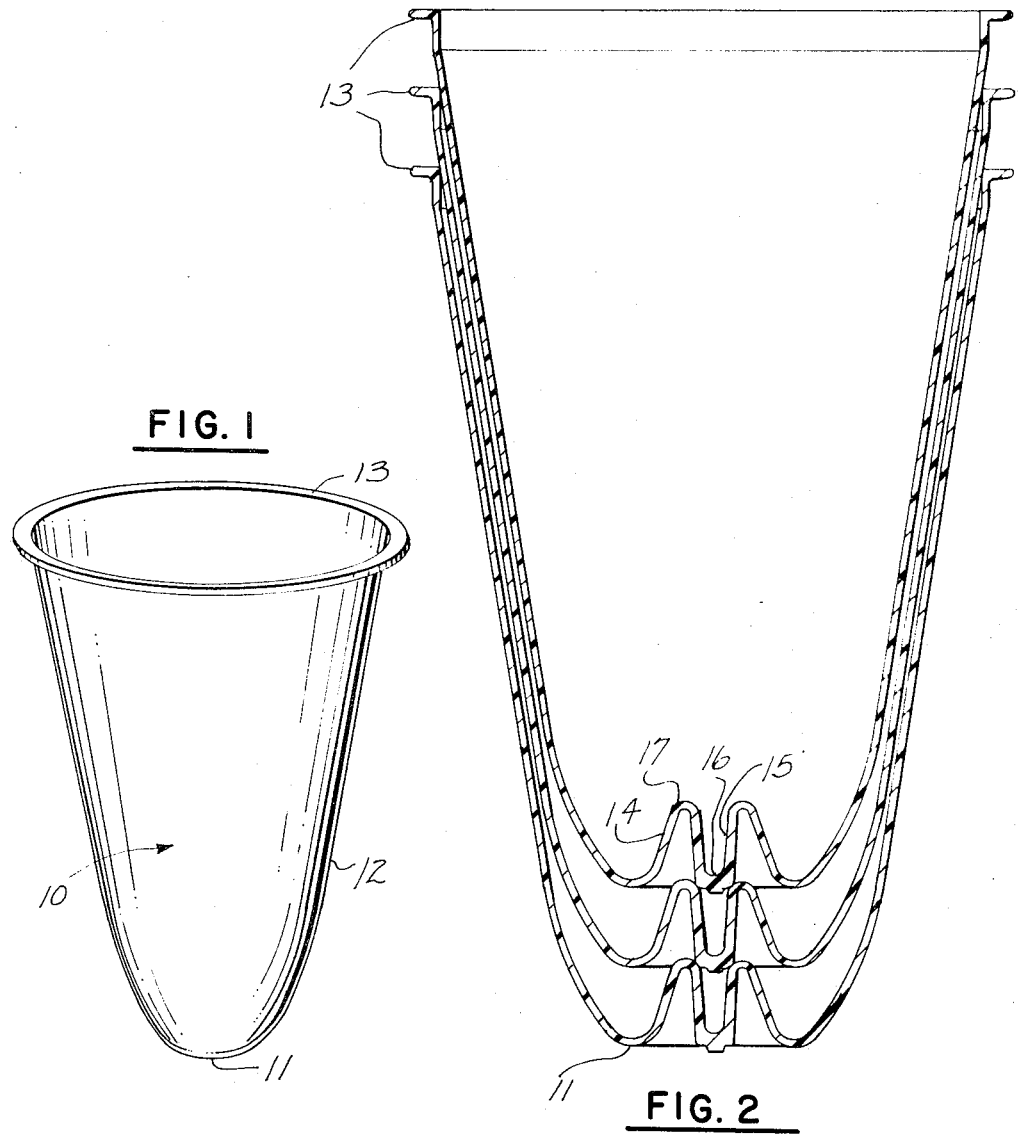

PATENTED JAN 8 1974 3,784,052

STACKABLE CONTAINER

BACKGROUND OF THE INVENTION

The invention comprises thin walled plastic container constructions having bottom stacking means for axially separating a nested plurality of such containers. It is primarily intended that the containers or cups of the first embodiment of the invention be formed by an injection molding process such as disclosed in my co-pending application Ser. No. 214,166, filed Dec. 30, 1971. It is further contemplated that both embodiments of the nestable containers of the subject invention be used in the thermoforming apparatus and process as disclosed in my co-pending application Ser. No. 214,275, filed Dec. 30, 1971 to produce non-nestable containers of various shapes.

SUMMARY OF THE INVENTION

Although the nestable containers of the subject invention can be used as finished products into which some product is placed, it is contemplated that the nestable containers of the subject invention be used further in a thermoforming process to produce non-nestable containers. The important utility in such a system is that a large amount of containers of the subject invention can be produced at one plant and shipped in a nested condition to another plant for forming into non-nestable containers. For example, in food and beverage industries, a food processor or beverage bottler with a relatively simple thermoforming machine and a stock of the nested containers of the subject invention can reform the containers of the subject invention into appropriate food or beverage containers and immediately fill and package the reformed containers for shipment to market. The present invention contemplates that in such circumstances, a manufacturing facility having supplies of raw plastics can form the containers of the subject invention by an injection molding process and then stack and package large numbers of such containers in relatively compact packages for storage and shipment. Because of the particular stacking configuration of the containers of the subject invention, packages of nested containers of the subject invention may be conveniently stored and shipped with a minimum possibility that the containers in any stack in the packages will jam or lock together.

The containers of the subject invention are formed as a cup having upwardly diverging side walls extending from a bottom wall and terminating in an open rim. The center portion of the bottom wall of the container is formed to have a stacking configuration which axially separates and supports a nested plurality of such cups. The bottom configuration of the container including the stacking means is sufficiently resilient to enable a stack of the containers in transportation or storage and in handling under conditions where a package of the containers may be dropped from a substantial height to absorb substantial shocks without bursting.

The stacking means of the container is defined by an annular projection extending upwardly into the container from the center of the bottom wall. Two embodiments of the container of the subject invention are shown in the drawings.

The primary object of the invention is to provide a container construction for relatively thin walled plastic containers with bottom stacking means which will permit a plurality of the containers to be nested in a stack and in which the stacking means will provide for easy denesting of individual containers and which will further provide sufficient resiliency to a stack of containers to prevent damage to the containers under conditions where shock loads are applied to the stack.

Other objects and features of the invention will be apparent upon a perusal of the hereinafter following specification and drawings.

BRIEF DESCRIPTION OF THE DRAWINGS

FIG. 1 is a perspective view of a container made according to the invention;

FIG. 2 is an enlarged cross sectional view of a plurality of containers such as shown in FIG. 1 to show the stacking or nesting arrangement of such containers;

DETAILED DESCRIPTION OF THE PREFERRED EMBODIMENTS

Figures 3, 4:
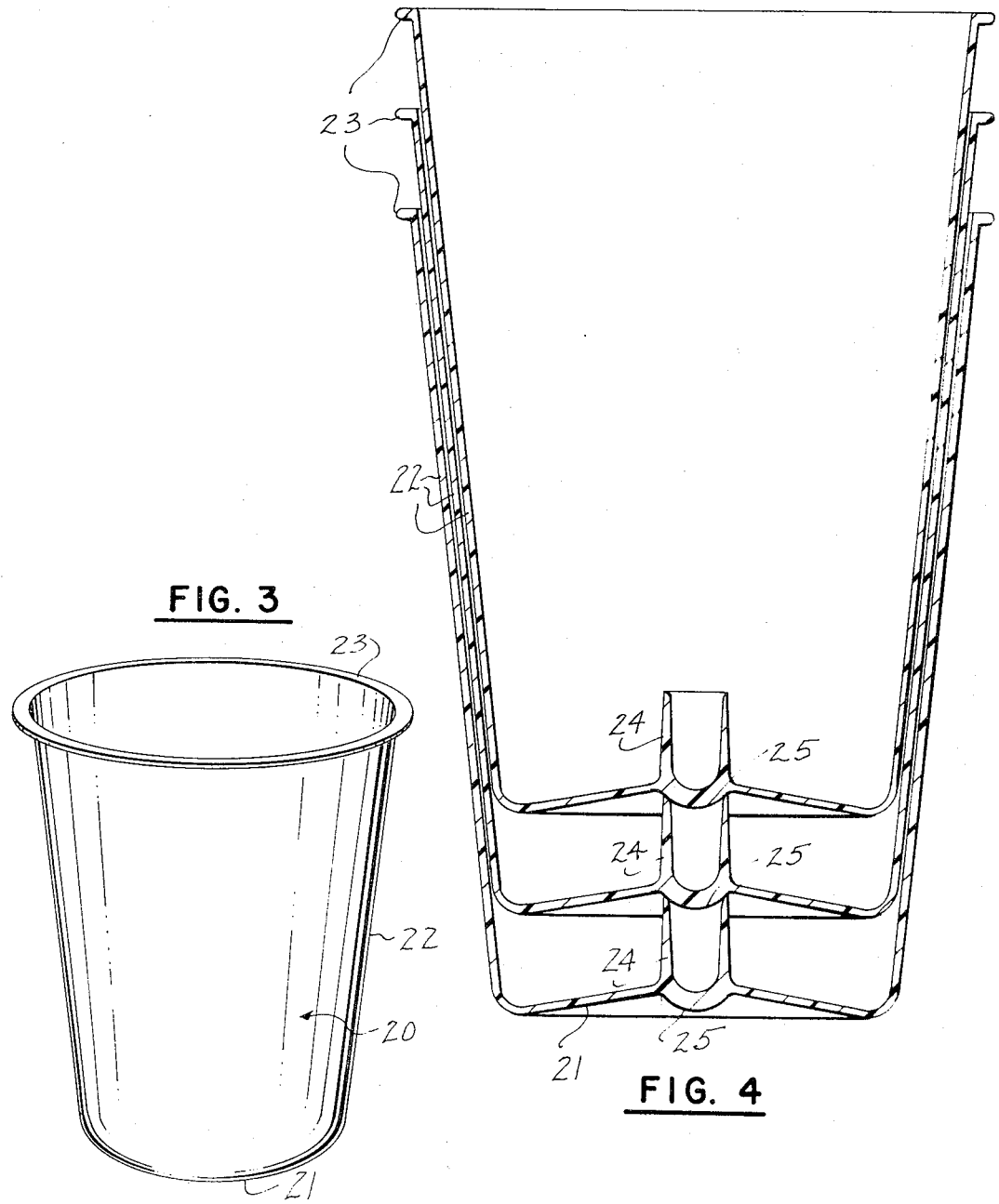
FIG. 3 is a perspective view of another embodiment of the invention.
FIG. 4 is an enlarged cross sectional view of a plurality of containers such as shown in FIG. 3 to show the nesting arrangement of such containers.

In the embodiment of the invention shown in FIGS. 1 and 2 the container 10 which is generally frusto-conical comprises a bottom wall 11 integrally formed with a side wall 12 which diverges upwardly to a rim 13 at the open upper end. It is contemplated that the container 10 be molded from a plastic material and that the walls thereof be relatively thin. The rim 13 is defined by an integral radially outwardly extending shoulder or ring which provides substantial radial rigidity to the relatively thin and flexible side wall 12 of the container 10.

As shown in FIG. 2, the center portion of the bottom wall 11 includes stacking means which comprises a generally annular section having an upwardly and inwardly tapered outer wall 14 and a substantially cylindrical inner wall 15. The lower end of the inner wall 15 of the annular section is closed by a bottom wall section 16. In the injection molding of the subject containers, the wall section 16 includes the gate at the injection nozzle of the molding equipment. The upper ends of the walls 14 and 15 are integrally interconnected by curved upper wall section 17. When a plurality of containers 10 are stacked, such as shown in FIG. 2, the outer periphery of the bottom wall section 16 rests upon and slightly within the curved upper wall section 17 of an adjacent nested container 10. Because of the described configuration of the containers 10 it may be seen that a stack of containers 10 are axially separated for easy denesting of individual containers and that any shock such as produced by dropping the stack will result in a resilient compression of the stack due to the inclination of the inner portion of the wall section 17 to the bottom wall section 16.

In the embodiment of the invention shown in FIGS. 3 and 4, the container 20 which is generally frusto-conical comprises a bottom wall 21 integrally formed with a side wall 22. The bottom wall 21 is inclined slightly upwardly toward the axis of the container. The side wall 21 diverges upwardly to a rim 23 at the open upper end. As in the first embodiment, the container 20 is preferably formed from a plastic material and the walls thereof are relatively thin.

As shown in FIG. 4, the center portion of the bottom wall 21 includes stacking means which comprises an upstanding generally annular or cylindrical section 24. The upper end of the annular section 24 is open and the lower end which is integrally formed within the bottom wall 21 is closed by a bottom wall section 25. The bottom wall section 25 is somewhat spherical or dish-shaped. When a plurality of containers 20 are stacked, such as shown in FIG. 4, the bottom wall section 25 of one container 22 will rest upon and extend slightly within the upper end of the annular section 24 of the adjacent nested container 22. Because of the described configuration of the container 20, it may be seen that a vertical stack of nested containers 22 will be axially spaced sufficiently to provide for easy denesting of adjacent containers. The inclination of the outer lower surface of the wall section 25 in engagement with the upper edge of the adjacent container 20 will provide, as in the first embodiment, a camming action which may be described as a stack resiliency to permit a stack of containers 20 to absorb dropping shocks.

Having described the invention it is to be understood that changes can be made in the described embodiments by one skilled in the art within the spirit and scope of the invention as defined in the claims.

I claim:

1. A generally frusto-conical and relatively thin walled nestable container of an injection molded plastic material comprising, a bottom wall and a side wall diverging upwardly to an open rim, said rim comprising an integral annular portion extending radially outwardly of said side wall, the center portion of said bottom wall including stacking means, said stacking means comprising an upstanding annular wall arrangement, said annular wall arrangement being open at the upper end thereof and closed at the bottom end thereof by a bottom wall section, said annular wall arrangement having a height sufficient to provide substantial axial separation between the rims of adjacent identical containers nested in a stack with the inner peripheral edge of the rim of each container in cooperation with the side wall of an adjacent container in a stack stabilizing arrangement, said annular wall arrangement comprising an outer annular wall section and an inner annular wall section spaced radially inwardly of said outer annular wall section, said bottom wall section being formed at the lower end of said inner annular wall section, said inner annular wall section and said bottom wall having substantially greater wall thickness than the side wall of said container, an upper annular wall section integrally formed between the upper ends of said outer annular wall section and said inner annular wall section, said upper annular wall section at the junction thereof to said inner annular wall section including a surface inclined downwardly toward the axis of said container, the diameter of the upper outer peripheral edge portion of said inclined surface being substantially greater than the diameter of the lower outer peripheral edge of said bottom wall section to cause engagement of said lower outer peripheral edge of said bottom wall by said inclined surface in a radial centering and vertical camming engagement of adjacent containers in a stack.

2. A container as defined in claim 1, wherein said outer annular wall section is formed to be inclined upwardly toward the axis of said container.

* * * * *